May 20, 1924.  1,495,091
B. W. MACH
MANUAL CONTROL MEANS FOR TRACTOR DRAWN HARVESTER BINDERS
Filed Dec. 16, 1919   5 Sheets-Sheet 1

WITNESS:
E. P. Ruppert

INVENTOR.
BY B. W. Mach
Victor J. Evans
ATTORNEY.

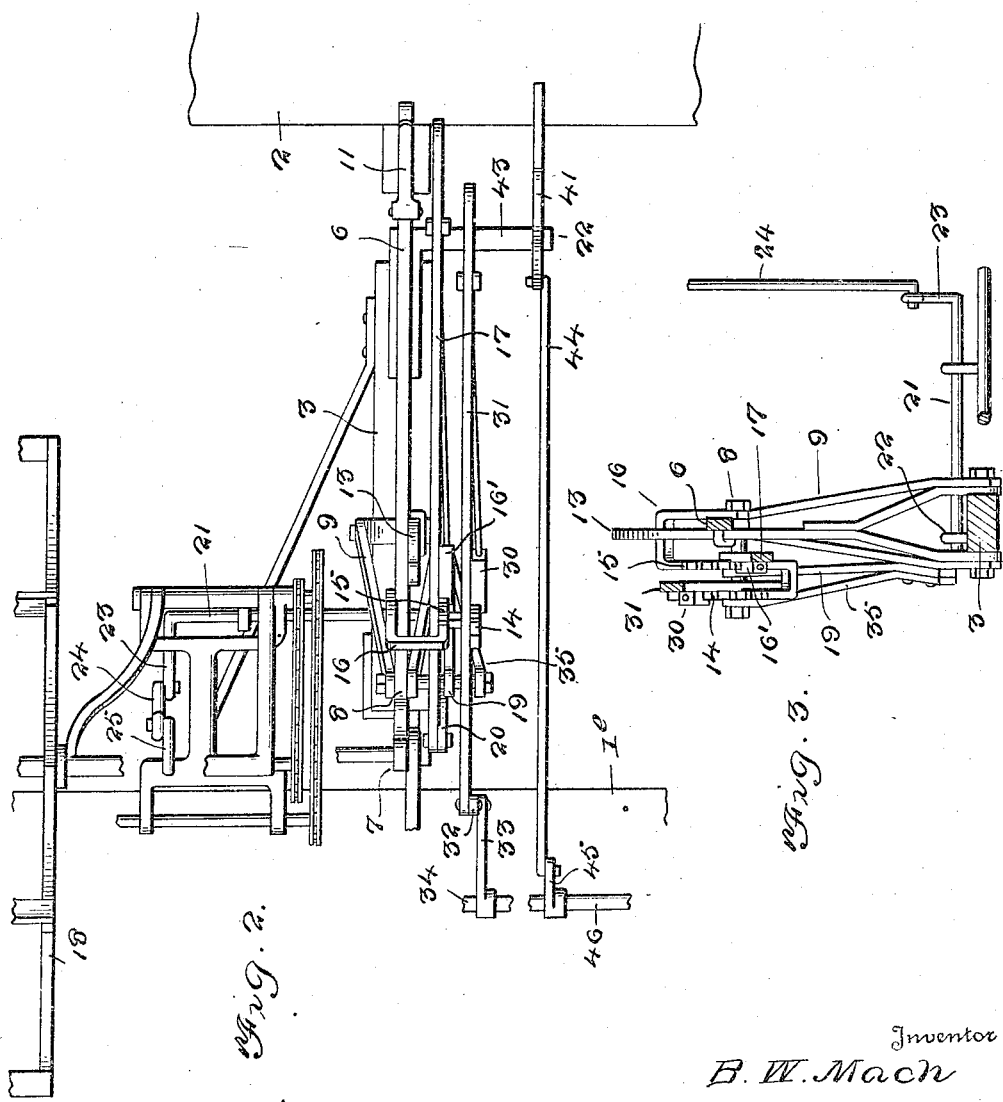

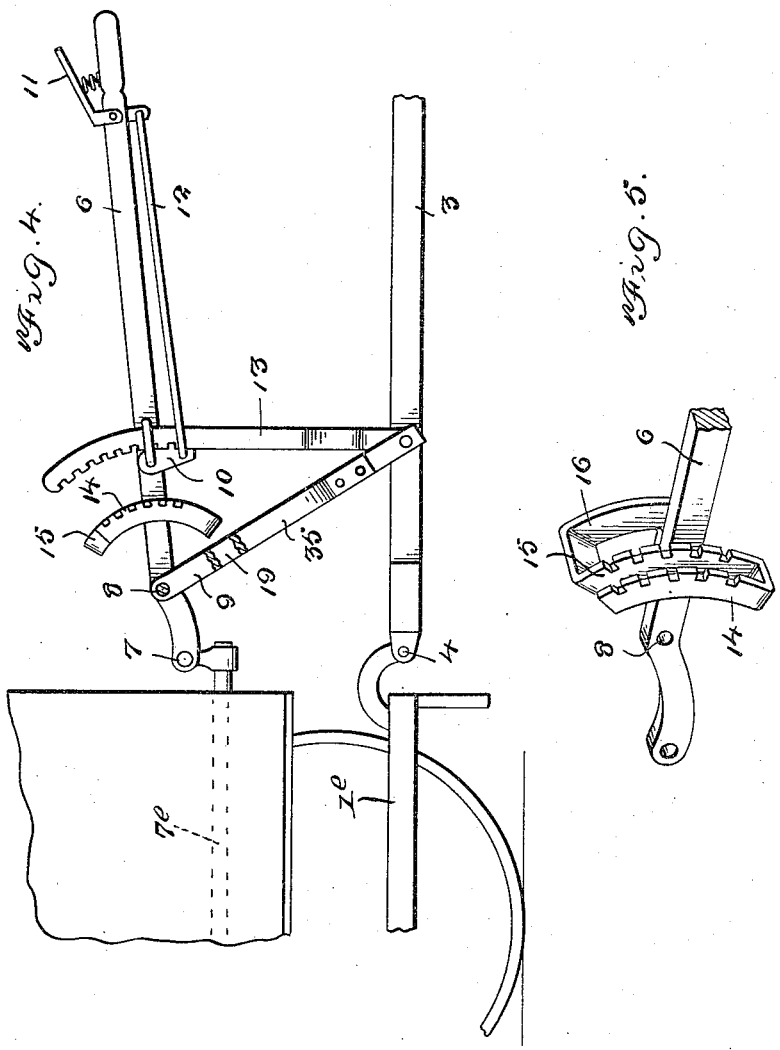

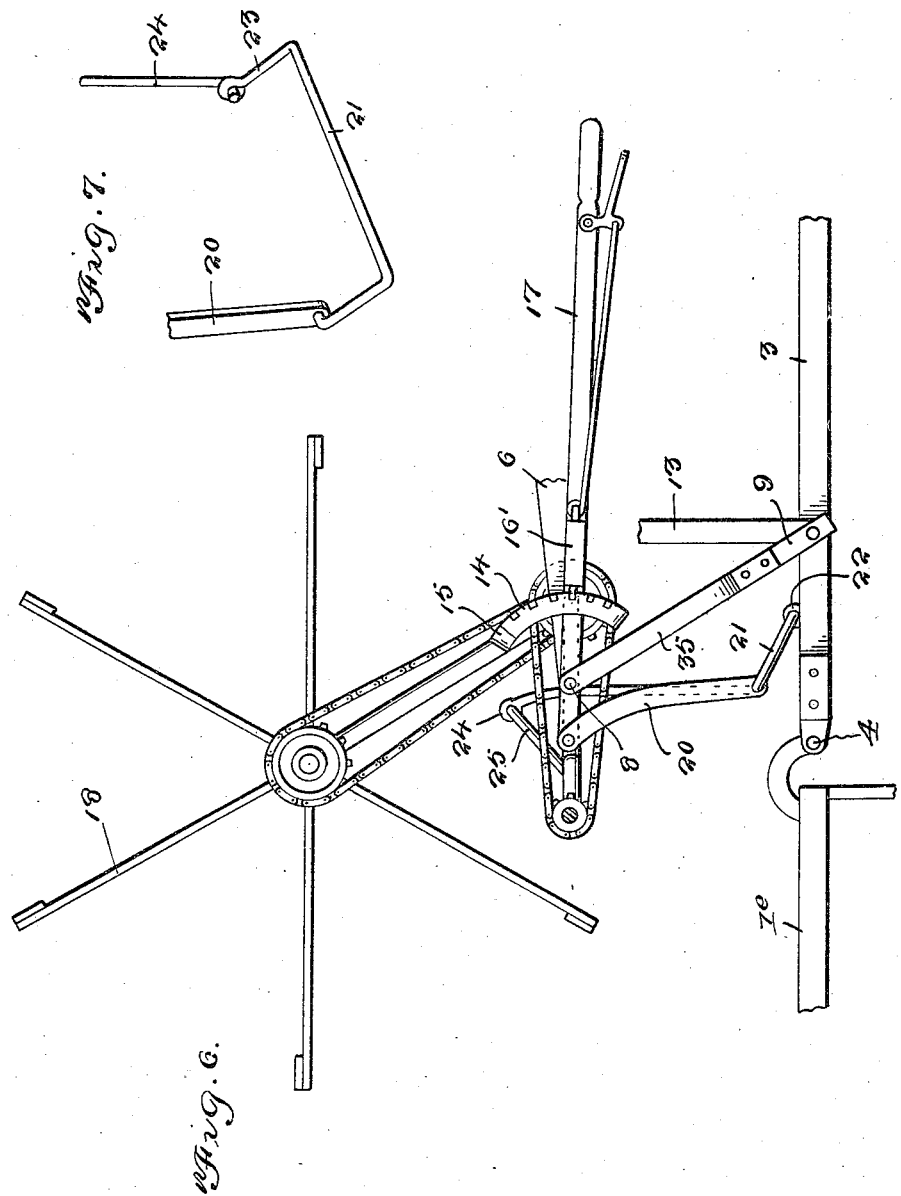

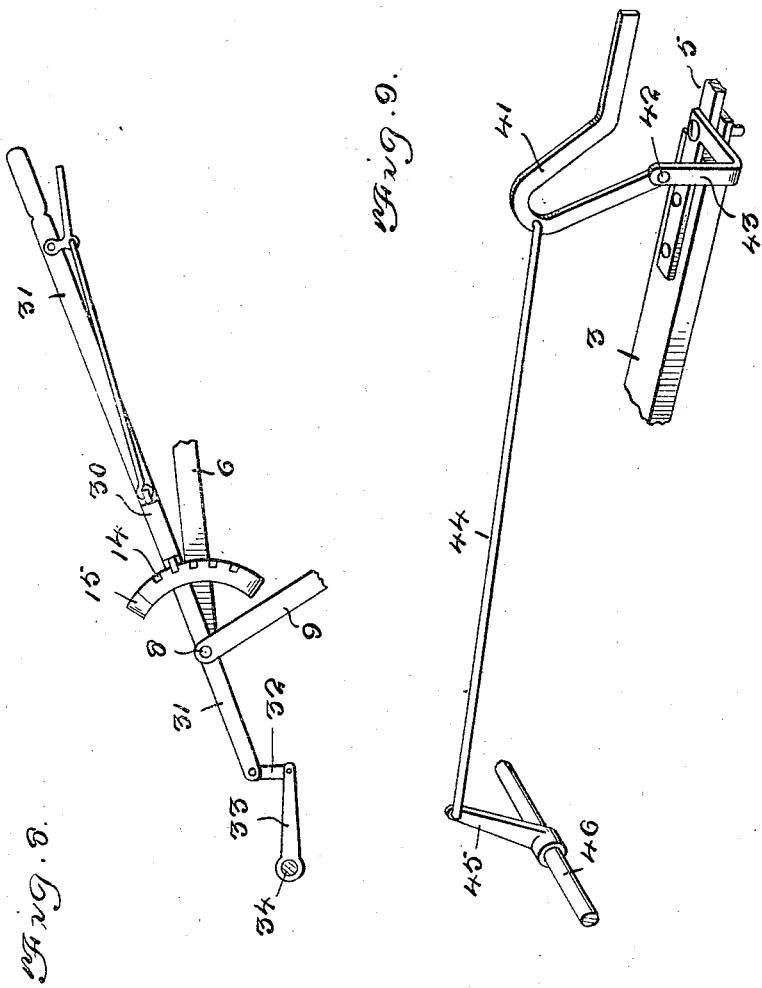

Patented May 20, 1924.

1,495,091

UNITED STATES PATENT OFFICE.

BENJAMIN W. MACH, OF CHICAGO, ILLINOIS.

MANUAL-CONTROL MEANS FOR TRACTOR-DRAWN HARVESTER BINDERS.

Application filed December 16, 1919. Serial No. 345,287.

*To all whom it may concern:*

Be it known that I, BENJAMIN W. MACH, a citizen of the United States, residing at Chicago, in the county of Cook and State of Illinois, have invented new and useful Improvements in Manual-Control Means for Tractor-Drawn Harvester Binders, of which the following is a specification.

The object of my present invention is the provision of simple, compact, efficient and reliable means whereby a tractor attendant is enabled to regulate and control a harvester binder, thereby obviating the necessity of employing a man on the binder for such purpose.

To the attainment of the foregoing, the invention consists in the improvement as hereinafter described and definitely claimed.

In the accompanying drawings, hereby made a part hereof:

Figure 2 is a plan view of the same.

Figure 3 is a detail transverse vertical section on the line 3—3 of Figure 1.

Figure 4 is a detail view of the means for adjusting and adjustably fixing the cutting platform and organized cutting mechanism of the harvester binder relatively to the ground to fix the height at which the grain will be cut.

Figure 5 is a fragmentary view in perspective hereinafter referred to.

Figure 6 is a detail elevation illustrative of the means for positioning the reel in accordance with the height of the ground to be harvested so as to enable the reel to work to the best advantage.

Figure 7 is a detail view in perspective of a portion of the mechanism shown in Figure 6.

Figure 8 is a detail side elevation of the means for enabling the attendant on the tractor to regulate the distance from the tops of the bundles at which the twine will be tied.

Figure 9 is a view in perspective showing the means for enabling the tractor attendant to control the bundle carrier of the harvester binder.

I illustrate but one embodiment of my invention, and therefore similar numerals of reference designate corresponding parts in all of the views of the drawings.

Figure 1:
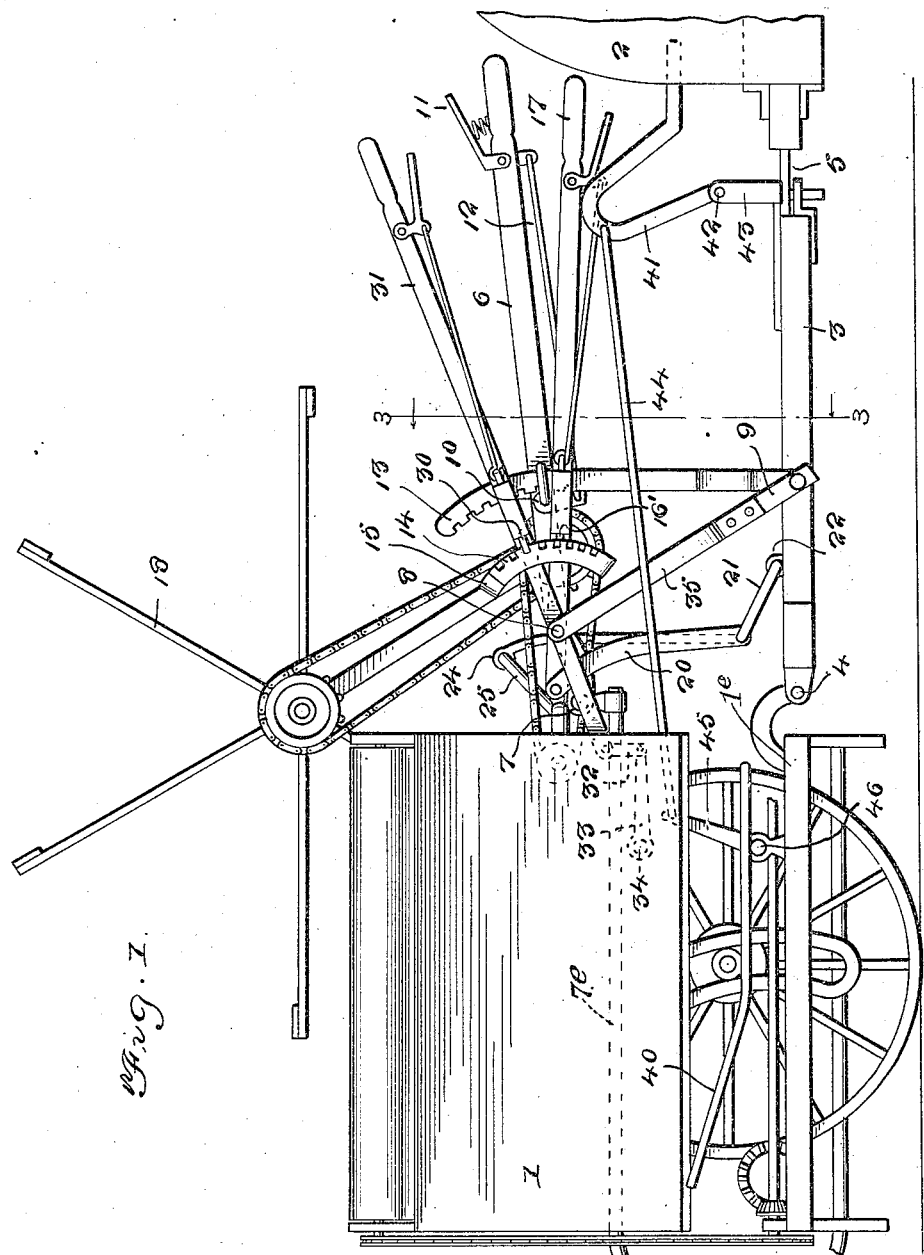
Figure 1 is a view illustrating so much of a harvester binder and a tractor as is necessary to illustrate the best practical embodiment of my invention of which I am cognizant.

With the exceptions hereinafter specifically alluded to, the harvester binder 1 and the tractor 2 may be and preferably are of the ordinary well known constructions.

I would also have it understood that the illustrated example of harvester binder is the well known type shown in Patent 1,325.614 of Dec. 23, 1919. It will also be noted by comparison of Figures 1, 2, 3, 4, 6 and 9, that a tongue 3 is interposed between the harvester binder and the tractor, and is pivotally connected at the point 4 to the harvester binder. At its forward end the said tongue is connected, as indicated by 5, to the tractor in the ordinary well known manner.

For the purpose of positioning and adjustably fixing the cutting platform 1ᵉ and the organized cutting mechanism of the harvester binder, to adapt said platform to the height of the grain to be harvested, I provide the means shown in detail in Figure 4. It will be understood in this connection that in the harvesting of tall grain, it is desirable to raise the cutting platform 1ᵉ and the cutting mechanism so as to avoid cutting too much straw, and when the grain to be harvested is short, it is desirable to lower the cutting platform and the cutting mechanism. Therefore I employ the longitudinal vertically swinging hand lever 6, pivotally connected at 7 to the yoke 7ᵉ fixed with respect to the main frame of the well known harvester binder. See Figure 4. The said lever 6 is fulcrumed at 8 between supporting standards 9 on the tongue 3, and is equipped with a detent 10 and the usual detent handle 11 and connecting rod 12, the said detent being for cooperation with a rack 13 that is fixed to the tongue 3, in order that the lever 6 and the parts connected therewith may be adjustably fixed in the positions desired. It will also be understood by comparison of Figures 3, 4, and 5, that the lever 6 has fixedly connected to it two parallel arcuate racks 14 and 15; the said racks 14 and 15 being carried by an overhanging arm 16 that is fixed to the opposite side of the lever 6, with reference to the arcuate racks. The arcuate rack 15 is provided for cooperation with the detent 16′ of the hand lever 17, Figure 6, through which the reel 18 is adjusted and adjustably fixed as to height. It will be understood that this provision is made in order to enable the reel to properly engage and move the upper portions of the standing grain stems rearwardly when the said grain stems are long, and also when the same are comparatively short. In other words, the reel may be adjusted as to height to adapt it to either long grain, short grain or grain of moderate height. The lever 17 is fulcrumed on the same rod 8 as the lever 6, and is arranged intermediate one of the standards 9 and an auxiliary standard 19, Figure 3, that is carried by the tongue 3. At its rear end, the lever 17 is connected through a link 20 with one arm of a transverse rockshaft 21 that is journaled at 22 on the tongue 3. The said rock-shaft 21 is provided at its opposite end, Figures 3 and 7, with an arm 23 that is connected through the medium of a rod 24 with a rod 25 through the medium of which the frame of the reel 18 may be adjusted or moved vertically, it being understood in this connection that the vertically movable frame of the reel is of the ordinary well known construction. See Patent 1,325,614 of Dec. 23, 1919.

The arcuate rack 14 is for cooperation with the detent 30 of the hand lever 31, that is fulcrumed on the same rod 8 as the levers 6 and 17 and has its rear end connected through a link 32 with an arm 33 on the rock-shaft 34 through the medium of which in well known manner the position of the binding twine relatively to the tops of the bundles is determined. See Patent 1,325,614 of Dec. 23, 1921. It will be observed that the said lever 31 is interposed between the standard 19 and an additional auxiliary standard 35, Figure 2, that is fixed with respect to the tongue 3.

As before indicated, my improvement is shown as associated with a well known type of harvester binder, the lever 31 being designed to move the needle and, therefore, the twine. The shaft 34 is common to the type of harvester binder indicated, and I therefore deem it unnecessary to show all of the connection between the lever 31 and the needle, the connection between the shaft 34 and the needle not being part of my invention.

At 40 in Figure 1 is the usual bundle carrier of the harvester binder, and at 41, Figures 1 and 9, is a foot lever, fulcrumed at 42 on a bracket 43 carried by the tongue 3 and connected through a rod 44 with an arm 45 on a rock-shaft 46 connected in the ordinary well known manner for bringing about tilting or canting of the carrier 40, so as to discharge the bundles from the said carrier 40 at suitable intervals. By virtue of this provision it will be manifest that the tractor attendant is also enabled to control with his foot the discharge of bundles from the carrier 40 when he deems the same expedient.

The hand lever 6, fulcrumed at 8, has a rear arm, and said arm is connected with a harvester binder to position the cutting platform and the cutting mechanism of the binder as to height. The hand lever 17 fulcrumed at 8 also has a rear arm and said rear arm is connected with the vertically-adjustable frame of the binder reel. The hand lever 31 also fulcrumed at 8 has a rear arm connected with the binder mechanism of the harvester binder for determining the position of the binding twine on the bundles.

It will be apparent from the foregoing that I have provided simple, inexpensive and easily operated means, through the medium of which the tractor attendant is enabled to control the salient working parts of the harvester binder.

While I have entered into a detailed description of the construction and relative arrangement of the parts of my improvement, it is to be understood that in the future practice of the invention such changes or modifications may be made as fairly fall within the scope of my invention as defined in my appended claims.

Having described my invention, what I claim and desire to secure by Letters Patent, is:

1. Harvester-binder control means for tractors, comprising a tongue for interposition between and connection with a harvester binder and a tractor, a standard carried by the tongue, a hand lever fulcrumed on the standard carried by the tongue and having an arm adapted to be connected with a harvester binder to position the cutting platform and the cutting mechanism of the binder as to height, a rack carried by the tongue, a detent carried by said hand lever for cooperation with the rack, arcuate racks carried by said hand lever, a second hand lever fulcrumed on the standard carried by the tongue and having an arm adapted to be connected with the vertically adjustable frame of the reel of the binder, a detent on the second lever for cooperation with one of the arcuate racks on the first lever, a third hand lever fulcrumed on the standard carried by the tongue and having an arm adapted to be connected with the binder mechanism of the harvester binder for determing the position on the bundles of the binding twine, and a detent carried by the third hand lever for cooperation with the remaining arcuate rack on the first lever.

2. Harvester-binder control means for tractors, comprising a tongue for interposition between and connection with a harvester binder and a tractor, a standard carried by the tongue, a hand lever fulcrumed on the standard carried by the tongue and having an arm adapted to be connected with a harvester binder to position the cutting platform and the cutting mechanism of the binder as to height, a rack carried by the tongue, a detent carried by said hand lever for cooperation with the rack, arcuate racks carried by said hand lever, a second hand lever fulcrumed on the standard carried by the tongue and having an arm adapted to be connected with the vertically adjustable frame of the reel of the binder, a detent on the second lever for cooperation with one of the arcuate racks on the first lever, a third hand lever fulcrumed on the standard carried by the tongue and having an arm adapted to be connected with the binder mechanism of the harvester binder for determining the position on the bundles of the binding twine, and a detent carried by the third hand lever for cooperation with the remaining arcuate rack on the first lever; the second lever including a rock shaft journaled on the tongue and provided with arms, a link intermediate the said arm of the second lever and one of said arms of the rock shaft, and a rod extending upwardly from the other arm of the rock shaft and adapted to be connected with the reel frame of the harvester binder.

3. Harvester-binder control means for tractors, comprising a tongue for interposition between and connection with a harvester binder and a tractor, a support on the tongue, a lever fulcrumed at an intermediate point of its length on said support and having an arm adapted to be connected with the cutting platform and the cutting mechanism of a harvester binder for the adjustment of the same as to height, means to adjustably fix said lever, a second lever fulcrumed on said support and having an arm adapted to be connected with the reel frame of the harvester-binder to adjust said reel frame as to height, cooperating means on the first lever and the second lever to adjustably fix the latter, a third lever fulcrumed on said support and having an arm adapted to be connected to the binder mechanism of the harvester binder for determining the position of binding twine on the bundles, and cooperating means on the first lever and the third lever to adjustably fix the latter.

4. Harvester-binder control means for tractors, comprising a tongue for interposition between and connection with a harvester binder and a tractor, a support on the tongue, a lever fulcrumed at an intermediate point of its length on said support and having an arm adapted to be connected with the cutting platform and the cutting mechanism of the harvester binder for the adjustment of the same as to height, means to adjustably fix said lever, a second lever fulcrumed on said support and having an arm adapted to be connected with the reel frame of the harvester binder to adjust said reel frame as to height, cooperating means on the first lever and the second lever to adjustably fix the latter, a third lever fulcrumed on said support and having an arm adapted to be connected to the binder mechanism of the harvester binder for determining the position of binding twine on the bundles, cooperating means on the first lever and the third lever to adjustably fix the latter, a fourth lever on the tongue, and means connected with said fourth lever and adapted to be connected with the bundle carrier of the harvester binder whereby the tractor attendant is enabled to also control the movement of the said bundle carrier.

In testimony whereof I affix my signature.

BENJAMIN W. MACH.